(12) United States Patent
Barr et al.

(10) Patent No.: US 7,225,270 B2
(45) Date of Patent: *May 29, 2007

(54) SELECTIVE DIVERSION AND INJECTION OF COMMUNICATION TRAFFIC

(75) Inventors: Anat Bremler Barr, Holon (IL); Hank Nussbacher, Ginot Shomron (IL); Roi Hermoni, Upper Galilee (IL); Dan Touitou, Ramat Gan (IL)

(73) Assignee: Cisco Technology, Inc., San Jose, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 11/045,001

(22) Filed: Jan. 26, 2005

(65) Prior Publication Data

US 2006/0050719 A1    Mar. 9, 2006

Related U.S. Application Data

(63) Continuation of application No. 10/821,804, filed on Apr. 8, 2004, now abandoned, which is a continuation-in-part of application No. PCT/IL02/00996, filed on Dec. 10, 2002, and a continuation-in-part of application No. 09/929,877, filed on Aug. 14, 2001, said application No. 10/821,804.

(60) Provisional application No. 60/461,390, filed on Apr. 9, 2003, provisional application No. 60/339,900, filed on Dec. 10, 2001, provisional application No. 60/240,899, filed on Oct. 17, 2000.

(51) Int. Cl.
 *G06F 15/173* (2006.01)

(52) U.S. Cl. .................. 709/238; 709/235; 709/239; 370/231; 370/235; 370/401

(58) Field of Classification Search ............... 370/231, 370/235, 401, 469; 726/13, 22; 709/217, 709/235, 238, 239; 379/222
See application file for complete search history.

(56) References Cited

U.S. PATENT DOCUMENTS 5,719,854 A * 2/1998 Choudhury et al. ........ 370/231
6,829,654 B1 * 12/2004 Jungck ...................... 709/246
6,901,053 B1 * 5/2005 Davies ...................... 370/237

OTHER PUBLICATIONS

Robert Stone, "Center Track: An IP Overlay Network for Tracking Denial-of-Service Floods", NANOG17, Oct. 5, 1999, UUNET Technologies.
Robert Stone, "Center Track: An IP Overlay Network for Tracking DoS Floods", Proceedings of the 9th USENIX Security Symposium, Denver, Colorado, USA, Aug. 14-17, 2000.

* cited by examiner

Primary Examiner—Frantz B. Jean
(74) Attorney, Agent, or Firm—Darby & Darby

(57) ABSTRACT

A method for communication includes coupling a first port of a Layer-3 packet router to receive communication traffic from a network, the traffic including packets destined for a target address, which is accessible via a second port of the router. At the router, the packets that are destined for the target address are diverted to a traffic processor via a third port of the router. The diverted packets are processed at the traffic processor, and returning the processed packets to the router via the third port. At the router, the processed packets are conveyed from the third port to the second port for delivery to the target address.

71 Claims, 5 Drawing Sheets

SELECTIVE DIVERSION AND INJECTION OF COMMUNICATION TRAFFIC

CROSS-REFERENCE TO RELATED APPLICATIONS

This application claims the benefit of U.S. Provisional Patent Application 60/461,390, filed Apr. 9, 2003. It is a continuation-in-part of U.S. patent application Ser. No. 09/929,877, filed Aug. 14, 2001 (and published as US 2002/0083175 A1), and of PCT Patent Application PCT/IL02/00996, filed Dec. 10, 2002. All these related applications are assigned to the assignee of the present patent application, and their disclosures are incorporated herein by reference.

COPYRIGHT NOTICE

Program listings in the disclosure of this patent document contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to computer networks, and specifically to methods and systems for diverting and processing selected traffic in a computer network.

BACKGROUND OF THE INVENTION

The above-mentioned U.S. patent application publication US 2002/0083175 describes a method for protecting against overload conditions in a set of one or more potential "victims" on a network, based on diverting traffic that is destined for the victims. To carry out this protection, a first set of network elements, such as routers, redirect the traffic to a second set of network elements, referred to as "guard machines." The diversion is actuated when a potential victim comes under an anomalous traffic condition, such as might be caused by a Distributed Denial of Service (DDoS) attack. The guard machines filter the diverted traffic to remove malicious (or excessive) traffic, and forward the legitimate traffic on to the victim. The publication describes a number of methods by which traffic diversion may be effected.

SUMMARY OF THE INVENTION

In embodiments of the present invention, network communication traffic that is destined for a particular target address (or set of addresses) is diverted to a traffic processor. After processing the diverted traffic, the traffic processor passes at least some of the processed traffic on to the original target address. This sort of traffic diversion and processing is particularly useful in the context of filtering out malicious traffic, as described in the above-mentioned U.S. and PCT patent applications. It may also be used in other sorts of network applications, such as in analysis of traffic flows for purposes of billing, forensics and traffic engineering.

In some embodiments of the present invention, a Layer-3 packet router, such as an Internet Protocol (IP) router, receives communication traffic from a network via a first port that is connected to the network. The traffic comprises packets that are destined for a target address, which is accessible via a second port of the router. The routing tables of the router are specially programmed so that when diversion is desired (due to a suspected attack, for example), the router diverts the packets that are destined for the target address to a traffic processor via a third port of the router. The processor returns the processed packets to the router via the third port. The special programming of the routing tables causes the router to convey these packets from the third port to the second port for delivery to the target address.

In some embodiments, multiple routers in a selected area of a network cooperate to divert traffic to the traffic processor. The selected area may comprise, for example, a private network or other autonomous system, which is coupled by peering routers to a Wide Area Network (WAN), such as the Internet. The peering routers are coupled by tunnels through the network to the diverting router that is connected to the traffic processor. When diversion is desired, the peering routers are instructed to pass traffic that is destined for the target address via the tunnels to the diverting router. In this manner, diversion can be accomplished by issuing the appropriate routing instructions to the peering routers, without active involvement of the remaining routers in the area of the network.

In further embodiments of the present invention, the traffic processor and the router from which the traffic is to be diverted to the traffic processor are coupled together in a common subnet, typically via a Layer-2 switch, such as an Ethernet switch. In such embodiments, the processed traffic is conveyed by the traffic processor back to the Layer-2 switch, which then forwards the traffic to the target address either directly (if the target address is also in the same subnet) or via another router in the subnet.

There is therefore provided, in accordance with an embodiment of the present invention, a method for communication, including:

coupling a first port of a Layer-3 packet router to receive communication traffic from a network, the traffic including packets destined for a target address, which is accessible via a second port of the router;

at the router, diverting the packets that are destined for the target address to a traffic processor via a third port of the router;

processing the diverted packets at the traffic processor, and returning the processed packets to the router via the third port; and at the router, conveying the processed packets from the third port to the second port for delivery to the target address.

In disclosed embodiments, diverting the packets includes detecting an indication that at least some of the traffic destined for the target address is of malicious origin, and diverting the packets responsively to the indication. Typically, processing the diverted packets includes filtering the diverted packets in order to identify the packets of the malicious origin, and inhibiting delivery of the identified packets.

In some embodiments, diverting the packets includes sending a Border Gateway Protocol (BGP) announcement from the traffic processor to the router, instructing the router to divert the packets. Typically, sending the BGP announcement includes inserting at least one of a "no-advertise" and a "no-export" string in the BGP announcement.

In some embodiments, diverting the packets includes establishing a tunnel through the network from a peering router to the first port of the Layer-3 packet router, configuring the Layer-3 packet router to forward the packets that it receives through the tunnel to the third port, and instructing the peering router to forward the packets that are destined for the target address through the tunnel. Establishing the tunnel may include establishing a plurality of tunnels from peering routers at an edge of an area of a network to the Layer-3 packet router within the area.

Typically, returning the processed packets includes selecting, at the traffic processor, a path via the Layer-3 packet router to the target address, and directing the Layer-3 packet router to convey the processed packets to a next-hop router along the selected path. Selecting the path may include identifying a plurality of paths, passing through respective next-hop routers to the target address, and selecting one of the next-hop routers through which the processed packets are to be conveyed. In some embodiments, selecting the one of the next-hop routers includes detecting, at the traffic processor, a change in the network between the second port of the router and the target address, and responsively to the change, selecting a different one of the next-hop routers through which to convey the processed packets to the target address.

Additionally or alternatively, selecting the path includes receiving routing information at the traffic processor from the Layer-3 packet router, and identifying the path based on the routing information. Typically, receiving the routing information includes receiving announcements generated by routers in the network in accordance with an automatic routing protocol. In one embodiment, receiving the announcements includes establishing at least one tunnel through the network between the traffic processor and the next-hop router, and receiving the announcements responsively to the at least one tunnel. In an alternative embodiment, receiving the routing information includes querying the Layer-3 packet router using a management protocol.

In a disclosed embodiment, directing the router includes establishing a tunnel through the network from the traffic processor via the router to the next-hop router, and passing the packets through the tunnel.

In some embodiments, conveying the processed packets includes programming the router with a forwarding rule with respect to the packets received by the router on the third port, so as to override a main routing table of the router, and forwarding the processed packets responsively to the forwarding rule. Programming the router may include invoking policy-based routing (PBR) or filter-based forwarding (FBF). Alternatively or additionally, programming the router includes configuring the router to apply the forwarding rule responsively to a type of service (ToS) field in the processed packets, and conveying the processed packets includes setting a value of the ToS field in the packets so as to cause the forwarding rule to be invoked.

In other embodiments, conveying the processed packets includes adding a virtual private network (VPN) designation to the processed packets, and conveying the processed packets includes programming the router with a VPN routing table, and forwarding the processed packets responsively to the VPN routing table. Typically, adding the VPN designation comprises adding a virtual local area network (VLAN) tag to the processed packets. In one of these embodiments, adding the VLAN tag includes defining a plurality of VLANs corresponding to different routes to the target address, and wherein adding the VLAN tag includes selecting one of the routes, and setting a value of the VLAN tag to designate the selected one of the routes.

There is also provided, in accordance with an embodiment of the present invention, a method for communication, including:

coupling one or more peering routers in an area of a network to receive communication traffic from outside the area, the traffic including packets destined for a target address;

forwarding the packets to the target address over one or more first routes via one or more internal routers within the area of the network;

establishing one or more tunnels through the network from the peering routers via one or more first ports of a diverting router within the area of the network to a second port of the diverting router;

coupling a traffic processor to the second port of the diverting router;

in response to a characteristic of the traffic, instructing the one or more peering routers to forward the packets that are destined for the target address through the one or more tunnels instead of over the first routes;

at the traffic processor, processing the packets that were forwarded through the tunnels via the diverting router; and conveying at least some of the processed packets from the traffic processor to the target address.

Typically, instructing the one or more peering routers includes sending a Border Gateway Protocol (BGP) announcement from the traffic processor to the one or more peering routers. Additionally or alternatively, instructing the one or more peering routers includes sending an instruction to the one or more peering routers, without modifying routing tables of the internal routers. The diverting router may serve as one of the internal routers on at least one of the first routes.

Typically, conveying the at least some of the processed packets includes conveying the at least some of the processed packets via the diverting router to the target address. Additionally or alternatively, conveying the at least some of the processed packets includes establishing a further tunnel between the traffic processor and an edge router on a path to the target address, and conveying the at least some of the processed packets through the further tunnel.

There is additionally provided, in accordance with an embodiment of the present invention, a method for communication, including:

coupling a first port of a Layer-3 packet router to receive communication traffic from a network, the traffic including packets destined for a target address;

coupling a second port of the Layer-3 packet router to a subnet, through which the target address is accessible;

diverting the packets that are destined for the target address to a traffic processor on the subnet via a Layer-2 switch in the subnet;

processing the diverted packets at the traffic processor, and returning the processed packets to the Layer-2 switch; and conveying the processed packets from the Layer-2 switch to the target address.

In some embodiments, the target address is in the subnet. In other embodiments, the target address is outside the subnet, and conveying the processed packets includes passing the processed packets from the Layer-2 switch to a further router in the subnet, and routing the processed packets from the further router to the target address.

There is further provided, in accordance with an embodiment of the present invention, apparatus for communication, including:

a Layer-3 packet router, including at least first, second and third ports, wherein the first port is coupled to receive communication traffic from a network, the traffic including packets destined for a target address, which is accessible via a second port of the router; and a traffic processor, which is coupled to the third port of the router, and is adapted to cause the router to divert the packets that are destined for the target address to the third port, and is further adapted to process the diverted packets and to return the processed packets to the router via the third port so as to cause the router to convey the processed packets from the third port to the second port for delivery to the target address.

There is moreover provided, in accordance with an embodiment of the present invention, apparatus for communication, including:

one or more peering routers in an area of a network, which are coupled to receive communication traffic from outside the area, the traffic including packets destined for a target address;

one or more internal routers within the area of the network, which are coupled to receive the packets from the one or more peering routers, and to forward the packets to the target address over one or more first routes;

a diverting router within the area of the network, the diverting router including one or more first ports and a second port, wherein the first ports are coupled to the peering routers by one or more tunnels through the network, and the diverting router is configured to forward the packets that it receives through the one or more tunnels to the second port;

a traffic processor, which is coupled to the second port of the diverting router, and which is adapted, in response to a characteristic of the traffic, to instruct the one or more peering routers to forward the packets that are destined for the target address through the one or more tunnels instead of over the first routes, to process the packets that were forwarded through the tunnels via the diverting router, and to convey at least some of the processed packets to the target address.

There is furthermore provided, in accordance with an embodiment of the present invention, apparatus for communication, including:

a Layer-2 switch, located in a subnet through which a target address is accessible;

a Layer-3 packet router, including first and second ports, wherein the first port is coupled to receive communication traffic from a network, the traffic including packets destined for the target address, and the second port is coupled to the Layer-2 switch; and a traffic processor, which is adapted to cause the Layer-3 packet router to divert the packets that are destined for the target address via the Layer-2 switch to the traffic processor, and which is further adapted to process the diverted packets and to return the processed packets to the Layer-2 switch so as to cause the Layer-2 switch to convey the processed packets to the target address.

There is also provided, in accordance with an embodiment of the present invention, a computer software product, for use by a computer in conjunction with a Layer-3 packet router that includes at least first, second and third ports, wherein the first port is coupled to receive communication traffic from a network, the traffic including packets destined for a target address, which is accessible via a second port of the router, and the computer is coupled to the third port, the product including:

a computer-readable medium in which program instructions are stored, which instructions, when read by the computer, cause the computer to instruct the router to divert the packets that are destined for the target address to the third port, and further cause the computer to process the diverted packets and to return the processed packets to the router via the third port so as to cause the router to convey the processed packets from the third port to the second port for delivery to the target address.

The present invention will be more fully understood from the following detailed description of the embodiments thereof, taken together with the drawings in which:

DETAILED DESCRIPTION OF EMBODIMENTS

Overview of Traffic Diversion in Layer-3 Topologies

Figure 1:
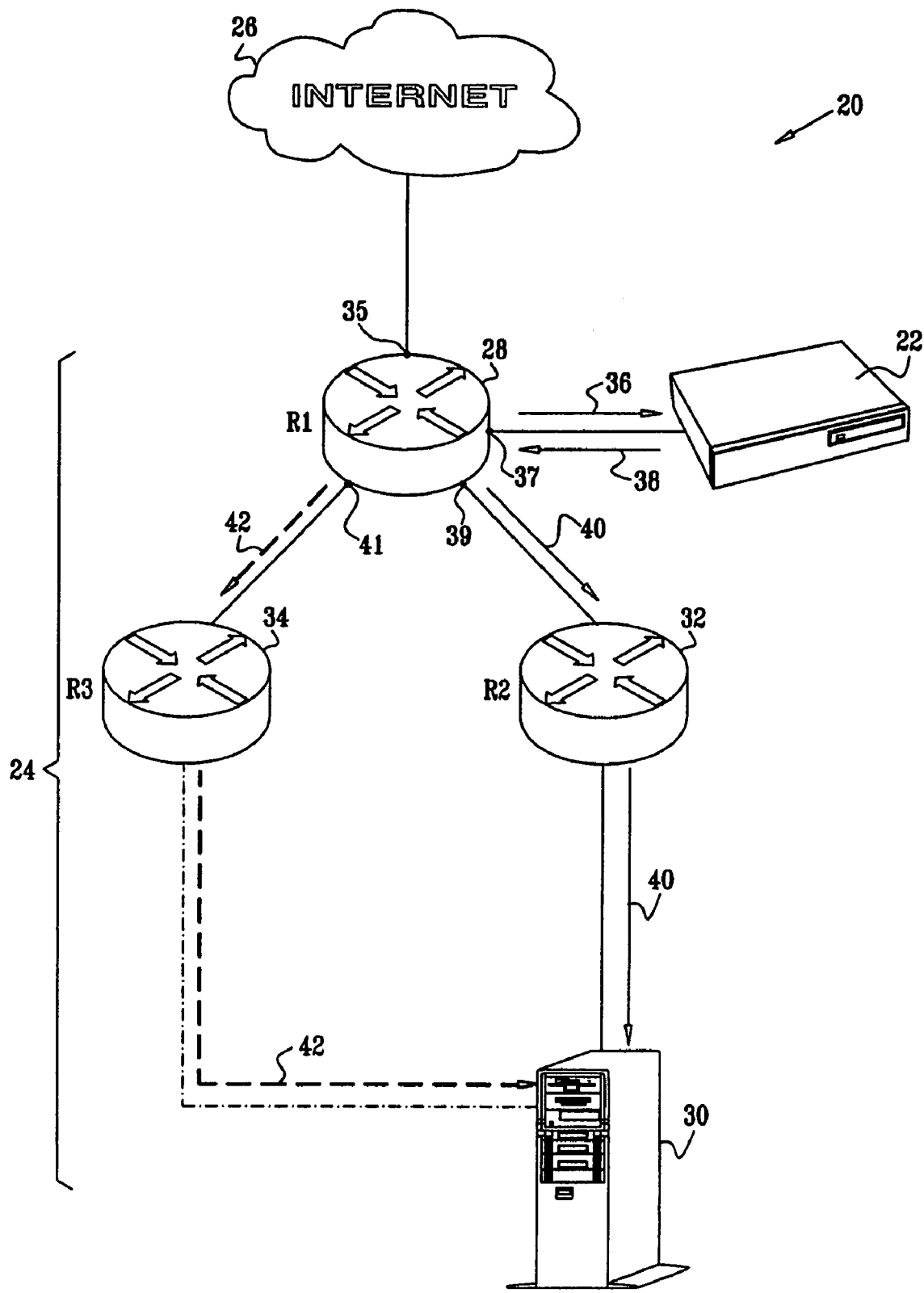
FIG. 1 is a block diagram that schematically illustrates a protected area of a computer network, in accordance with an embodiment of the present invention.

FIG. 1 is a block diagram that schematically illustrates a communication network 20, in accordance with an embodiment of the present invention. A guard device 22 serves as a traffic processor, which filters out malicious traffic that is directed to target addresses in a protected area 24 of network 20. Protected area 24 communicates with a wide-area network (WAN) 26, typically the Internet, through a Layer-3 router 28, typically an Internet Protocol (IP) router. The protected area comprises various other network elements, such as a server 30 and internal routers 32, 34, as well as other computers, switches and local-area networks (LANs), which are omitted from this figure for the sake of simplicity. Typically, although not necessarily, protected area 24 comprises a private network, such as an enterprise or campus network, or a network operated by an Internet Service Provider (ISP).

In the context of the present patent application and in the claims, the terms "Layer-2" and "Layer-3" are used in accordance with their conventional meanings, as given by the well-known Open Systems Interface (OSI) model. Thus, Layer-2 refers to the data link layer, and includes medium access control (MAC) functionality as provided, for example, by Ethernet local area networks (LANs), switches and other components. Layer-3 refers to the network layer, and includes functions such as IP packet routing, for example. Although the embodiments described hereinbelow make reference particularly to Ethernet and IP and to certain common Ethernet and IP device types and routing protocols, the principles of the present invention may similarly be applied, mutatis mutandis, in networks using other protocols and devices.

For simplicity and clarity, certain aspects of the present invention will be described hereinbelow with reference to protection of server 30 (which may also be referred to as the "victim" or "target") from Denial of Service (DoS) attacks. It will be understood, however, that guard device 22 may typically be configured to protect not only server 30, but also other computers in protected area 24. Furthermore, multiple guard devices may be deployed in connection with router 28 or with other routers or switches of other types in area 24. Typically, guard device 22 comprises a general-purpose computer, which is programmed in software to carry out the functions described herein. Alternatively, guard device 22 may be implemented in dedicated hardware logic, or using a combination of hardware and software elements. The guard device may be a standalone unit, or it may alternatively be integrated with other communication or computing equipment, such as router 28, a firewall, or another intrusion detection system (not shown). Although the guard device is shown and described herein, for the sake of simplicity, as a single, discrete unit, in practice the functionality of the guard device may be distributed among multiple physical units, which may be collocated or distributed among a number of different locations.

Router 28 (marked R1, and referred to alternatively as the "divert-from router") receives packets from WAN 26 on a first port 35. Under normal network conditions, when router 28 receives packets that are addressed to the IP address of server 30 (referred to hereinbelow as the "target address"), it simply passes the packets on to server 30 via a port 39 or 41. As shown in the figure, either of routers 32 and 34 (marked R2 and R3) is capable of passing the packets on to server 30. The choice of which of ports 39, 41 to use for forwarding traffic to server 30 is normally determined by routing tables held by router 28.

Figure 2:
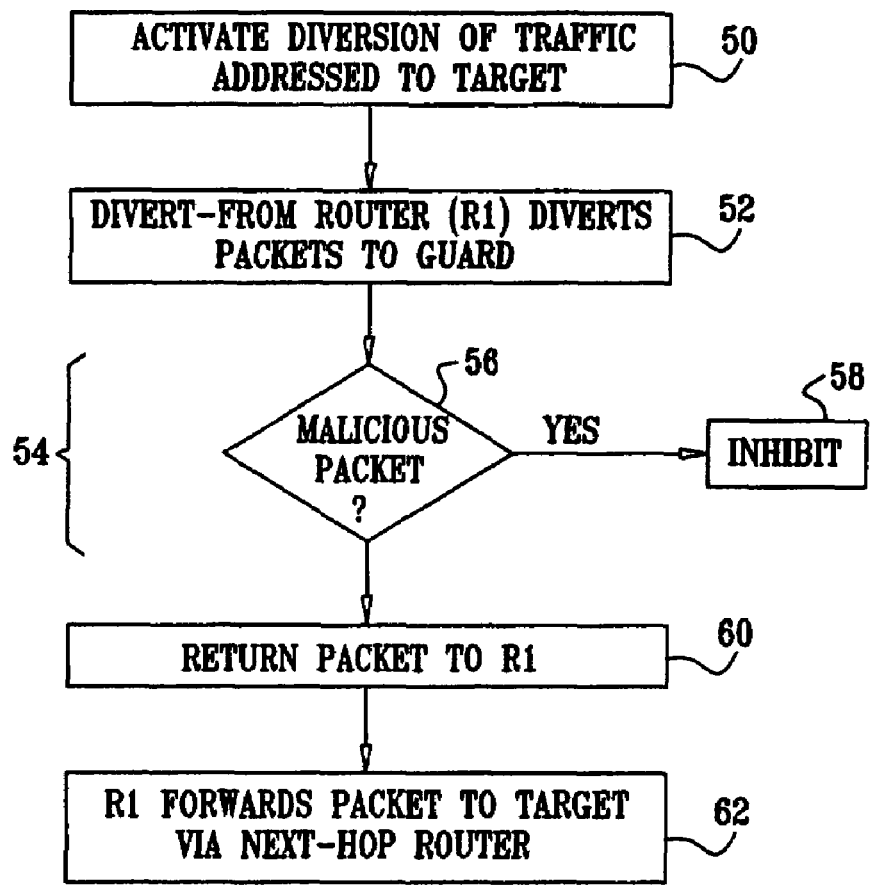
FIG. 2 is a flow chart that schematically illustrates a method for packet diversion, in accordance with an embodiment of the present invention.

FIG. 2 is a flow chart that schematically illustrates a method for diversion of traffic to guard device 22, in accordance with an embodiment of the present invention. Upon detection of anomalous traffic conditions, which may be indicative of a DoS attack on server 30, router 28 is instructed to divert traffic that is destined for the server to guard device 22, at a diversion initiation step 50. Methods and criteria for detection of anomalous traffic conditions are described, for example, in the above-mentioned U.S. and PCT patent applications. Anomalous traffic characteristics may be detected by the guard device, by server 30, or by other elements in area 24, and the instructions to router 28 and to other network elements to begin traffic diversion may come the guard device itself for from another element in area 24. Diversion is effected by instructing router 28 to change its routing table so that traffic addressed to server 30 is routed over a diversion path 36 via a port 37 to guard device. Methods for carrying out this step are described hereinbelow.

After receiving the instruction to change its routing table, router 28 diverts all traffic destined for server 30 to guard device 22, at a diversion step 52. The guard device processes each packet, at a packet processing stage 54, in order to prevent malicious traffic from reaching server 30. For example, guard device 22 may filter the packets, at a packet filtering step 56, in order to detect certain features that are characteristic of illegitimate, malicious traffic. Additionally or alternatively, the guard device may attempt to determine whether the source address of each packet is authentic or spoofed. Methods for packet filtering and for distinguishing between authentic and illegitimate source addresses are described in the above-mentioned U.S. and PCT patent applications, as well as in other publications and patent applications, such as U.S. patent application Ser. No. 10/232,993, filed Aug. 29, 2002, which is assigned to the assignee of the present patent application and whose disclosure is incorporated herein by reference. Guard device 22 inhibits delivery of packets that appear to be malicious, at an inhibition step 58. Typically, the guard device either discards the suspect packets or delivers them to server 30 with low priority, so that they do not prevent the server from handling normal traffic that has been authenticated by the guard device.

Guard device 22 returns filtered traffic to port 37 of router 28 via a return path 38, at a packet return step 60. Router 28 then forwards the traffic over an onward path 40 or 42, via either router 32 (R2) or router 34 (R3), at a forwarding step 62. This next router along the path from the guard device to the target address is referred to hereinbelow as the "next-hop router." Note that the regular routing table of router 28 was changed at step 50 to list port 37 as the route to server 30. Based on this routing table, upon receiving packets from guard device 22 that are addressed to server 30, at step 60, the router would normally just send the packets back to port 37, in an endless loop. Techniques for circumventing this normal router behavior, so as to cause the packets to be forwarded to the next-hop router, are described hereinbelow. Alternatively, guard device 22 may be connected directly to a port of the next-hop router, but this arrangement is costly in terms of the extra wiring and port infrastructure that are required to support it.

Figure 3:
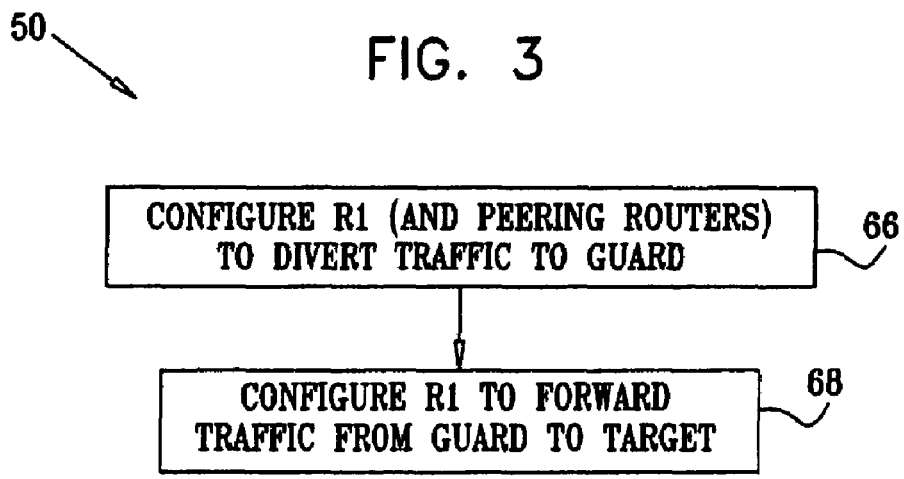
FIG. 3 is a flow chart that schematically illustrates a method for configuring a router, in accordance with an embodiment of the present invention.

FIG. 3 is a flow chart that schematically shows details of diversion initiation step 50, in accordance with an embodiment of the present invention. As noted above, two changes are typically made in the routing tables of router 28: Router 28 is configured to divert traffic destined for the address of server 30 to guard device 22 via port 37, at a diversion configuration step 66. The router is configured to forward traffic from guard device 22 to server 30 via the appropriate next-hop router (such as router 32 or 34), at a forwarding configuration step 68.

Traffic Diversion Methods

Typically, for the purpose of traffic diversion at step 66, guard device 22 issues a routing announcement to router 28, such as a BGP announcement using the well-known Border Gateway Protocol (BGP). BGP is described in detail in by Rekhter et al., in Request for Comments (RFC) 1771 of the Internet Engineering Task Force (IETF), entitled "A Border Gateway Protocol 4 (BGP-4)" (1995), which is incorporated herein by reference. This RFC and other IETF RFC documents cited hereinbelow are available at www.ietf.org/rfc.html. The BGP announcement causes router 28 to modify its routing table so that path 36 is listed as the best path to the target address. When the area of the network protected by the guard device is connected to other areas of WAN 26 by one or more peering routers (as shown below in FIG. 4, for example), BGP announcements may be issued to the peering routers, as well. BGP has an inherent added advantage that the BGP routing algorithm will automatically cancel diversion to guard device 22 in case of a failure of the guard device.

Typically, protected area 24 constitutes an autonomous system (AS) within network 20, which communicates with other autonomous systems in WAN 26. Routers within a given AS communicate with one another using Internal BGP (iBGP) announcements, and this is the type of announcement that guard device 22 sends to router 28 at step 66. Alternatively, External BGP (eBGP) announcements may be used, depending on the configuration of the guard device and routers in protected area 24. In order to ensure that the BGP announcement by the guard device overrides any previous routing decisions, the guard device typically uses a longer (more specific) prefix to represent the target address in its BGP announcement than was used in previous announcements. The guard device may even use the full IP address of server 30 in the BGP announcement. Alternatively, guard device 22 may assign a high value to the "weight" field provided in its BGP announcements, which will cause the announcements to override previous routing decisions based on announcements of lower weight.

The BGP announcement issued by guard device 22 at step 66 causes router 28 to change its routing table, but preferably has no effect on the routing tables of routers 32 and 34. For this purpose, the guard device inserts "no-advertise" and "no-export" community strings in the BGP announcement. Inclusion of these strings prevents router 28 from propagating the BGP announcement and thus limits the effect of the announcement to the intended router. The guard device may also add other community strings, such as an identifying string that permits a system operator studying the router logs to identify routing decisions that were initiated by the guard device.

Traffic Forwarding

A number of alternative techniques for carrying out forwarding configuration step 68 are described hereinbelow. Typically, guard device 22 sends a control message (using BGP, for example) to router 28 indicating the next-hop router for forwarding. For this purpose, the guard device may be pre-programmed with the identity of the next-hop router for each target address in area 24. Alternatively, the guard device may use an autonomous next-hop discovery mechanism to determine the next-hop router that should be used for each target address. Methods for next-hop discovery are described hereinbelow. These methods enable the guard device to respond dynamically to changes in the network configuration.

A number of exemplary techniques for configuring router 28 at step 68 will now be described:

1) Destination-based Policy-Based Routing (PBR-DST)

This is a static method, which uses special policy-based routing (PBR) facilities provided by many routers. These facilities permit the system operator to create special routing rules for certain traffic, which override the normal routing table of the router. In the example shown in FIG. 1, PBR is used to program router 28 to forward to the next-hop router (router 32 or 34) those packets that it receives on port 37 and which have a destination address equal to the IP address of server 30. This rule overrides the entry with respect to this IP address in the main routing table of router 28, which was programmed by BGP announcement at step 66 to forward such traffic to guard device 22 on port 37. Router 28 applies this PBR rule only to packets that it receives on port 37. Guard device 22 may configure the PBR rule in advance, so that when it activates diversion of traffic for server 30 at step 50 (FIG. 2), PBR forwarding goes into effect at the same time, without the need to reconfigure router 28 in real time.

The term "PBR" is known in the art mainly in reference to routers distributed by Cisco Systems (San Jose, Calif.). Cisco PBR is described, for instance, in a document entitled "Configuring Policy-Based Routing" (2004), which is available at www.cisco.com/en/US/products/sw/iosswrel/ ps1831/products_configuration_guide_chapter09186a00800c60d2. html, and is incorporated herein by reference. Similar facilities are offered by other router manufacturers, in some cases under different names. For example, routers distributed by Juniper Networks (Sunnyvale, Calif.) provide "Filter-Based Forwarding" (FBF) with similar capabilities to PBR. FBF is described by Semeria in "Filter Based Forwarding" (2001), which is available at www.juniper.net/solutions/literature/ white_papers/552004. pdf, and which is also incorporated herein by reference. In the case of FBF, the filter configuration may be used to specify the IP destination address of server 30; a routing instance configuration specifies the routing table or tables that are applied in forwarding packets matching the configured filter; and an interface routes configuration specifies the routing instance that is to be used for packets matching the filter that are received at each port of the router. A forwarding technique based specifically on Juniper FBF is described in detail hereinbelow.

Listing I below gives a sequence of commands that may be used to program router 28 for PBR-DST forwarding of traffic from guard 22 to next-hop router 32, as illustrated in FIG. 1. The listing uses Cisco router programming conventions. Terms in brackets < . . . > are to be replaced by appropriate parameter values. Each line represents a command, which should be typed into the router interface followed by <ENTER>.

---

LISTING I - ROUTER PROGRAMMING FOR PBR-DST

R7200(config)# interface FastEthernet 0/2
R7200(config-if)# description <Port 37>
R7200(config-if)# ip address <IP address of port 37> < IP mask of port 37>
R7200(config-if)# no ip directed-broadcast
R7200(config-if)# ip policy route-map <PBR-name of guard device 22>
R7200(config-if)# exit
R7200(config)# ip access-list extended <Name of server 30>
R7200(config-ext-nacl)# permit ip any host <IP address of server 30>
R7200(config-ext-nacl)# exit
R7200(config)# route-map <PBR-name of guard device 22> permit 10
R7200(config-route-map)# match ip address <Name of server 30>
R7200(config-route-map)# set ip next-hop <IP address of router 32>
R7200(config-route-map)# exit
R7200(config)# route-map <PBR-name of guard device 22> permit 100
R7200(config-route-map)# description let thru all other packets without modifying next-hop

---

As noted above, PBR-DST is a static forwarding method. In other words, once the system operator has programmed the PBR rules indicating the next-hop router in case of traffic diversion, all diverted packets will pass through the next-hop router unless and until the PBR rules are reprogrammed. Dynamic forwarding methods using PBR are described hereinbelow.

2) VPN Routing and Forwarding (VRF)

Some embodiments of the present invention make use of virtual private network (VPN) routing capabilities that are offered by many router manufacturers. System operators normally use these facilities to define multiple VPNs that share the same physical infrastructure, often by means of network tunneling protocols. For example, Cisco routers have a feature known as VPN routing and forwarding (VRF), as described in "Designing MPLS Extensions for Customer Edge Routers" (Product Bulletin No. 1575, 2003), which is available at www.cisco.com/warp/public/cc/pd/rt/2600/prodlit/1575_pp. htm, and which is incorporated herein by reference. MPLS is described in detail by Rosen et al., in IETF RFC 3031, entitled "Multiprotocol Label Switching Architecture" (January, 2001). VRF may similarly be applied, mutatis mutandis, in other types of VPNs, such as VPN services over physical interfaces or over other sorts of tunnel interfaces, such as Generic Routing Encapsulation (GRE) or Layer Two Tunneling Protocol (L2TP) tunnels.

Many VPN implementations use virtual bridged local area networks, as specified in the IEEE 802.1Q standard. In accordance with this standard, a VLAN tag is added to each Ethernet frame, thus defining the virtual local area network (VLAN) on which the frame is to be transmitted. Each VLAN on a given port of router 28 is treated by the router as a separate virtual port and can have its own routing table, which is separate from the main (native VLAN) routing table. This feature is used in the present embodiment.

In one embodiment of the present invention, a unique VLAN is configured on port 37 of router 28 for each destination (such as server 30) or group of destinations that are protected by guard device 22. This technique is referred to herein as destination-based VRF, or VRF-DST. To implement VRF-DST in the system shown in FIG. 1, two interfaces are configured on port 37 of router 28:

The native VLAN interface is used for traffic that is received via port 35 and is diverted onto path 36 to guard device 22, as specified in the main routing table of router 28. (At step 66, guard device 22 uses the native VLAN interface to send the BGP announcement to router 28 initiating traffic diversion.)

A second VLAN interface is used to inject traffic received from guard device 22 over path 38 to next-hop router 32, in accordance with a VRF table that is configured for this VLAN. Note that this is a static forwarding method, like PBR-DST. A dynamic variant is described below.

Listing II provides a sequence of commands that can be used to program routers 28 and 32 to carry out VRF-DST forwarding from guard device 22 to server 30. This listing uses Cisco router programming conventions, as in Listing I above. In this example, the native VLAN interface of port 37 is assumed to have IP address 192.168.8.1, while the VLAN interface used for traffic on path 38 has IP address 192.168.5.1. Guard device 22 is similarly configured with separate VLAN interfaces for paths 36 and 38, on the same subnets as the corresponding interfaces of port 37. Port 39 of router 28, which connects to path 40, is assumed to have IP address 192.168.250.1/24, while server 30 has IP address 192.168.240.2/24. The native VLAN is configured as VLAN 1, while VLAN 5 is used for traffic injection from guard device 22 to router 32. Instructions for the system operator are given in italics.

---

LISTING II - ROUTER PROGRAMMING FOR VRF-DST

Configure route on router 28 from port 39 to server 30
via router 32, by BGP announcement from guard device 22
on VLAN 5:
  ip route 192.168.240.0 255.255.255.0 192.168.5.1
Create a VRF table on router 28:
  ip vrf Guard-vrf
    rd 1680:1
    route-target export 1680:1

---

-continued

LISTING II - ROUTER PROGRAMMING FOR VRF-DST route-target import 1680:1
Configure the native VLAN on router 28:
interface fastEthernet1/0.1
  encapsulation dot1Q 1 native
  description << VLAN FOR GUARD-DIVERSION >>
  ip address 192.168.8.1 255.255.255.0
  no ip directed-broadcast
Configure the VLAN interface on router 32:
Interface fastEthernet 1/0.5
  encapsulation dot1Q 5
  description << VLAN FOR GUARD-INJECTION >>
  ip vrf forwarding Guard-vrf
  ip address 192.168.5.1 255.255.255.0
Configure the interface from router 32 to server 30:
interface fastEthernet 2/0
  description << LINK TO SERVER >>
  ip address 192.168.250.1 255.255.255.0

---

In an alternative embodiment, multiple VPNs may be established in order to permit guard device 22 to select the route to use for packets destined for server 30. For this purpose, in the system shown in FIG. 1, multiple VLANs are configured on port 37 of router 28, each corresponding to a different route to server 30. For example, VLAN 5 may correspond to path 40 via router 32 to server 30, while VLAN 6 corresponds to path 42 via router 34. Router 28 in this case has (at least) three virtual ports on port 37, each of which has its own routing table: Packets on the native VLAN use the main routing table, as described above, while packets on VLAN 5 and VLAN 6 use their own, respective VRF tables for routing of packets from guard device 22 to server 30. Configuration of the routing tables and interfaces is performed using commands similar to those given above in Listing II.

Guard 22 may use this multi-VLAN facility in dynamically selecting the route to use for each packet that is destined for server 30. Thus, at step 60 (FIG. 2), guard device 22 inserts a VLAN tag into the packets that it sends over path 38 to router 28, and sets the VLAN value to either 5 or 6 in order to cause the router to forward the packets via router 32 or router 34 as desired. Guard device 22 may select the VLAN tag value (and hence the route) depending on changing network conditions or other factors of which the guard device may become aware, typically by monitoring routing protocol messages exchanged among the routers in system 20.

3) Type-of-Service Policy-Based Routing (ToS-PBR)

IP packets conventionally include a ToS field in their header. This field was initially intended to permit different service levels to be defined for different IP packets in a network. In the present embodiment, however, guard device 22 inserts a ToS field value in the IP header of packets that it sends over path 38 to router 28 at step 60 (FIG. 2) in order to control the onward routing of these packets. PBR is configured on port 37 of router 28 so as to select the onward packet route depending on the packet ToS value. Thus, for example, PBR on router 28 may be programmed so that packets received on port 37 with the destination address of server 30 and ToS=2 are forwarded to router 32.

Furthermore, guard 22 may use the ToS field to dynamically select the route to use for packets destined for server 30. For example, the PBR rules on router 28 may specify that packets addressed to server 30 with ToS=2 are to be forwarded to router 32, while those with ToS=3 are to be forwarded to router 34. As in the preceding embodiment, guard device 22 may select the ToS (and hence the route) depending on changing network conditions or other factors of which the guard device may become aware.

4) VLAN Policy-Based Routing (VLAN PBR)

This technique combines aspects of techniques (1) and (2) that are described above. Like the multi-VPN variant of technique (2), VLAN PBR permits guard device 22 to dynamically select the packet injection route. In the present embodiment, router 28 uses the VLAN tag of packets received on port 37 as a filtering criterion for selection of the appropriate PBR rule. Thus, for example, the router may be configured to forward packets destined for server 30 on VLAN 5 via path 40 to router 32, while forwarding packets destined for server 30 on VLAN 6 via path 42 to router 34. The routing tables and interfaces are configured using commands similar to those given above in Listings I and II. At step 60, guard device 22 selects the value of the VLAN tag in packets that it sends to router 28 depending on the desired route.

5) FBF Instance-based Routing

Juniper FBF, as noted above, permits a separate routing table to be created in router 28 for purposes of routing traffic sent to the router by guard device 22 over path 38. Router 28 is programmed with a FBF rule, instructing the router to use this separate routing table (referred to hereinbelow as the Guard-Interface-Routing-Table) in routing all traffic arriving on port 37 from guard device 22. The Guard-Interface-Routing-Table is populated with all the routes from the main routing table of router 28, except those routes that are specified explicitly by guard device 22. The route entries specified by the guard device are identified by a special community string inserted by the guard device.

Thus, in the example shown in FIG. 1, guard device 22 will create an entry in the Guard-Interface-Routing-Table indicating that traffic destined for server 30 should be forwarded to router 32. This entry will be preserved even when the guard device modifies the main routing table of router 28, at step 50, to divert all other traffic destined for server 30 from router 28 to the guard device. The guard device may modify the entries in the Guard-Interface-Routing-Table using appropriate BGP announcements. Thus, the present FBF-based technique permits the guard device to modify packet routing dynamically in response to network conditions or other requirements.

Listing III below provides a sequence of commands that can be used to program router 28 to perform packet injection from guard device 22 to server 30, using Juniper FBF. For the purposes of this example, it is assumed that port 37 of router 28 has IP address 192.168.8.16/24; the ports of routers 32 and 34 facing router 28 have IP addresses 192.168.240.2/24 and 192.168.230.2/24, respectively; and server 30 has IP address 192.168.240.2/24. Instructions for the system operator are given in italics.

LISTING III - ROUTER PROGRAMMING FOR FBF

Configure port 37:
interfaces {
  ge-0/0/0 {
    unit 0 {
      family inet {
        filter {
          input guard-filter;
        }
        address 192.168.8.16/24;

-continued

LISTING III - ROUTER PROGRAMMING FOR FBF

}
    }
  }
}
Configure port 39 interface to router 32:
  interfaces {
    fe-0/0/0 {
      unit 0 {
        family inet {
          address 192.168.250.1/24:
Configure port 41 interface to router 34:
  interfaces {
    fe-0/0/0 {
      unit 0 {
        family inet {
          address 192.168.230.1/24:
Configure filter for port 37 so that packets destined for
port 35 are referred to the main routing table, while all
other packets are handled by the Guard-interface-routing-
table:
filter guard-filter {
  term 10 {
    from {
      destination-port 179;
    }
    then accept;
  }
  term 20 {
    then routing-instance guard-interface-
      routing-table;
  }
}
Configure routing instance (add Guard-interface-routing-
table to router 28):
routing-instances {
  Guard-interface-routing-table
    instance-type forwarding;
    routing-options {
      instance-import without-guard-announcement;
      auto-export;          /* no export of routes
    }
}
Define instance-import policy ("without-guard-
Announcement"):
policy-options {
  policy-statement without-guard-announcement {
    term 10 {
      from {
        instance master;         /* main routing table
        protocol bgp;
        community riverhead;   /* special community
                                /* string
      }
      then reject;
    }
    term 20 {
      then accept;
    }
  }
}

6) Tunnel-based Forwarding

Figure 4:
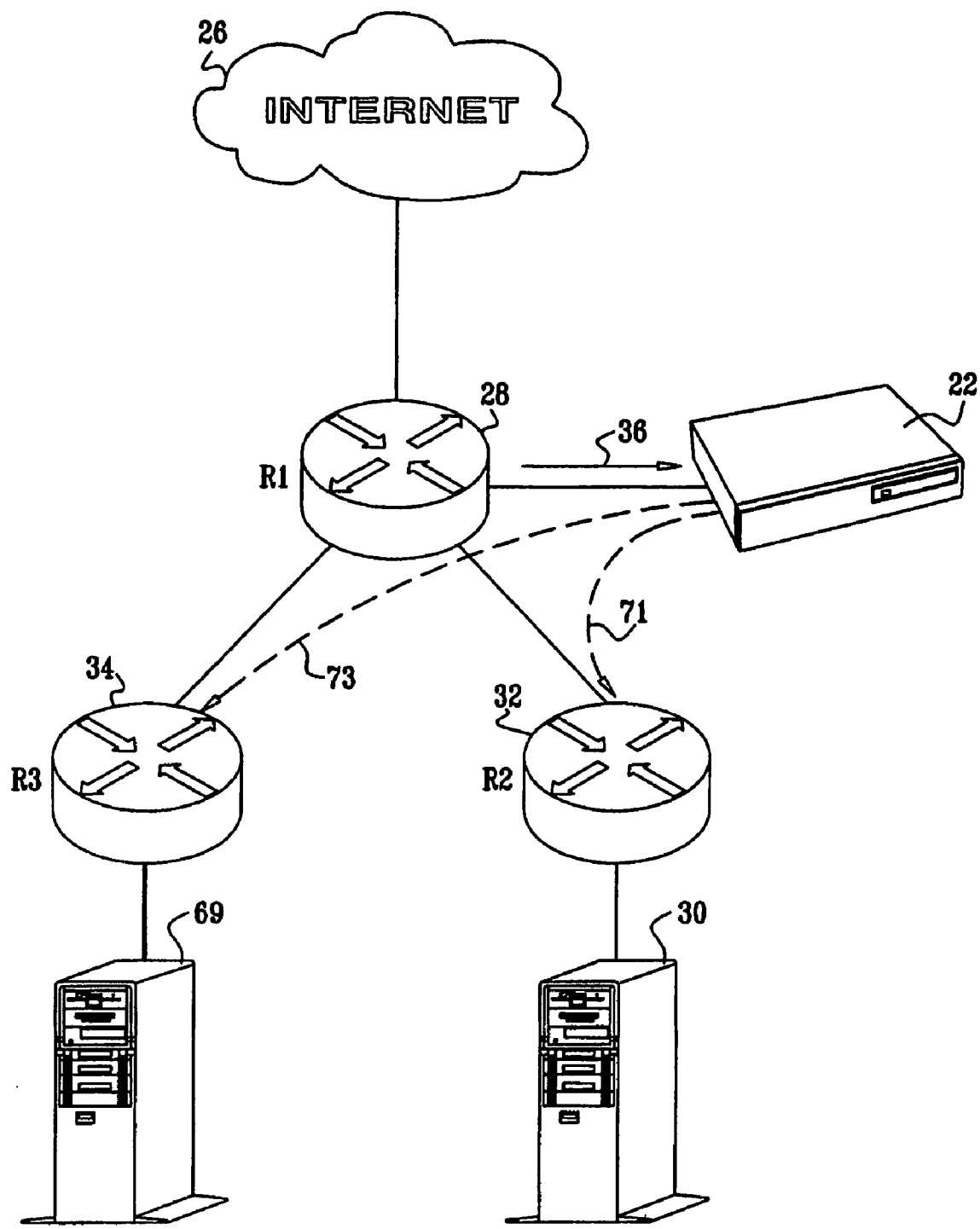
FIG. 4 is a block diagram that schematically illustrates tunnels within a network, which are used for packet injection in accordance with an embodiment of the present invention.

FIG. 4 is a block diagram that schematically illustrates the use of tunnels 71 and 73 for packet injection from guard device 22 to servers 30 and 69, respectively, in accordance with an embodiment of the present invention. Tunnels 71 and 73 may be defined using any suitable network tunneling protocol known in the art, such as MPLS, GRE, IPIP or L2TP. MPLS is described in RFC 3031, as noted above. GRE is described by Farinacci et al., in IETF RFC 2784, entitled "Generic Routing Encapsulation" (2000). IPIP is described by Perkins in IETF RFC 2003, entitled "IP Encapsulation within IP" (1996). Both of these documents are incorporated herein by reference.

As shown in FIG. 4, tunnels 71 and 73 connect guard device 22 to routers 32 and 34, respectively. In order to inject packets via router 28 to server 30 or 69 at step 60, the guard device encapsulates the packets with a suitable label in accordance with the selected tunneling protocol. The label in each packet identifies the tunnel that the packet is to traverse. Router 28 is configured to support the selected protocol, so that upon receiving an encapsulated packet, router 28 simply forwards the packet along the pre-configured label-switched path (i.e., through the appropriate tunnel), without referring to its own routing table or making any other routing decision. Upon receiving the encapsulated packet, router 32 or 34 de-encapsulates the packet and then passes it on to server 30 or 69 in accordance with the destination IP address of the packet.

Note that in many networks, multiple tunnels may be established from guard device 22 leading to server 30. In the example shown in FIG. 1, for instance, one tunnel may be established along path 40 to router 32, and another along path 42 to router 34. At step 60, guard device 22 may then select one of the tunnels dynamically, in response to changes in network conditions or other factors.

Centralized Diversion in a Protected Network

Figure 5:
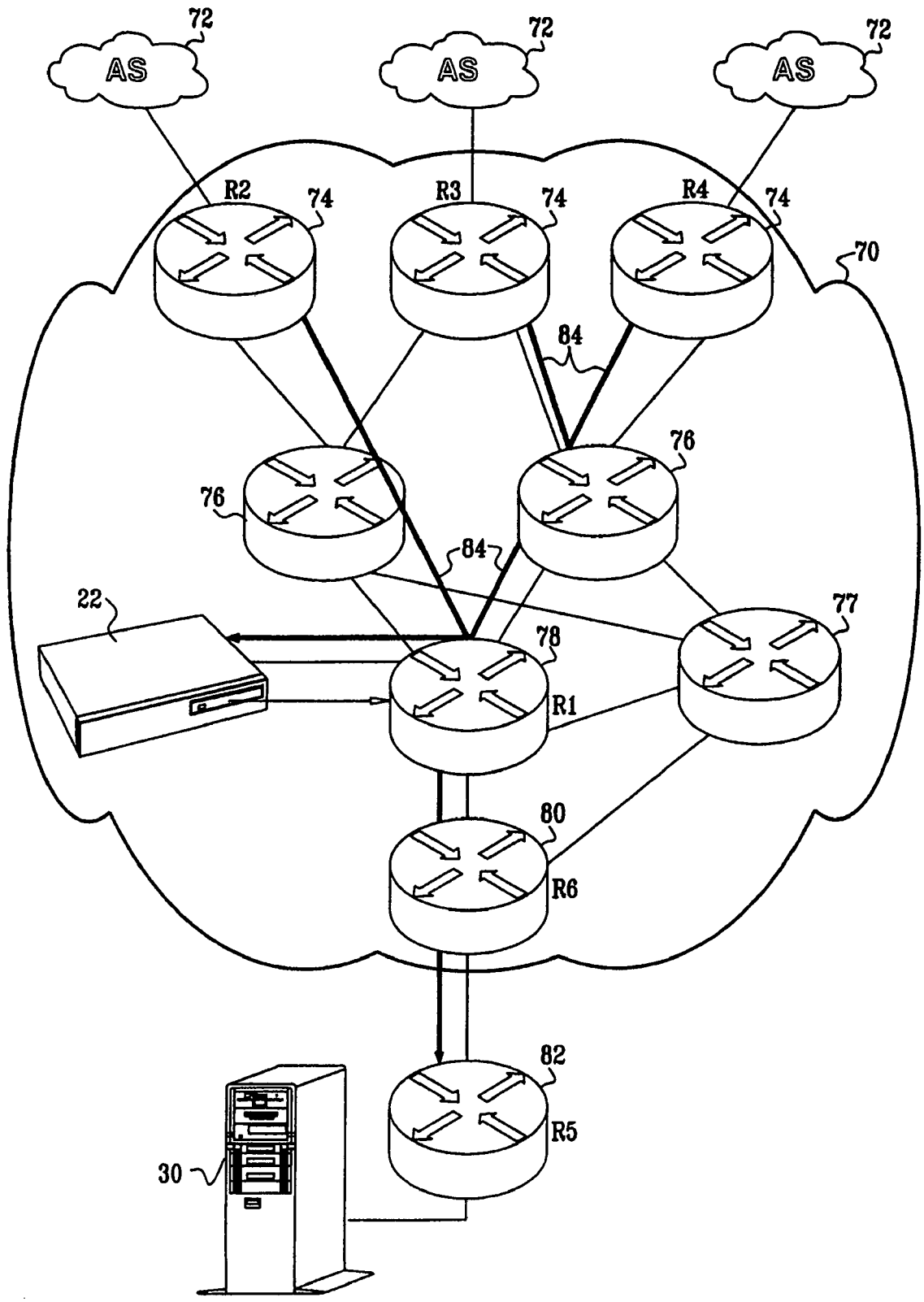
FIG. 5 is a block diagram that schematically illustrates a protected area of a network, in accordance with another embodiment of the present invention.

FIG. 5 is a block diagram that schematically illustrates a protected area 70 of a network, in which peering routers 74 are configured to divert selected traffic to guard device 22 in accordance with an embodiment of the present invention. The protected area is typically configured as an autonomous system (AS), which communicates with other autonomous systems 72 via peering routers 74. For example, protected area 70 may comprise a campus or enterprise network or an access network maintained by an Internet Service Provider (ISP), while systems 72 are part of a WAN, such as the Internet, or belong to other entities. More generally, however, peering routers 74 may comprise any group of one or more routers that are coupled to receive communication traffic from outside a given area of the network and to convey the traffic to internal routers (and other network elements) inside the area. Under normal traffic conditions, when peering routers 74 receive traffic destined for server 30 from systems 72, the peering routers forward the traffic through area 70 via internal routers 76, 77 in area 70 to an edge router 80. The edge router then forwards the traffic to server 30, possibly via an external router 82 on the premises of the customer operating the server.

When traffic diversion is required, such as during a suspected DDoS attack on server 30, a divert-from router 78 inside area 70 diverts the traffic that is destined for server 30 to guard device 22. (Typically, the divert-from router also serves as one of the intermediate routers for normal traffic.) In this embodiment, however, it is also necessary to ensure that all traffic destined for server 30 that is received by peering routers 74 be forwarded to divert-from router 78, and not bypass the divert-from router via another path, through router 77, for example. Although guard device 22 could achieve this result by sending a BGP announcement at step 50 (FIG. 2) to all the routers in area 70, such an announcement incurs substantial overhead, and it is desirable to limit the BGP announcement to a smaller number of routers.

For this purpose, in the present embodiment, tunnels 84 are established between peering routers 74 and guard device 22, via divert-from router 78. Any suitable tunneling protocol may be used for this purpose, including the above-mentioned MPLS, GRE, IPIP and L2TP protocols. When diversion to guard device 22 is invoked, the peering routers encapsulate packets destined for server 30 with the appropriate tunneling labels, and forward the encapsulated packets through tunnels 84. These tunnels pass through intermediate routers 76, which simply forward tunnel-encapsulated packets along the pre-defined label-switched tunnel paths, without having to refer to their own routing tables. Router 78 may be configured as an egress proxy, as defined by MPLS, meaning that the router de-encapsulates the packets sent over tunnels 84 and delivers the original packets, without encapsulation, to guard device 22 at the end of the tunnel. This proxy feature relieves the guard device of having to support the tunneling protocol itself.

When guard device 22 determines that diversion of packets is necessary, it activates diversion (step 50, FIG. 2) by sending an iBGP announcement to peering routers 74. This announcement includes no-advertise and no-export strings, so that the peering routers do not propagate the routing change to any of the other routers in area 70. The iBGP announcement instructs routers 74 that all traffic destined for server 30 should be forwarded via tunnels 84. (It is not necessary to send the iBGP announcement to divert-from router 78, since the divert-from router, as egress proxy, passes all packets received through tunnels 84 on to guard device 22 without having to make its own routing decision.) As noted earlier, the iBGP announcement sent by guard device 22 at step 50 overrides the original BGP announcement used for normal routing of packets to server 30, typically by using a longer IP address prefix in the announcement at step 50 than was used in the original announcement.

After processing the packets at stage 54, guard device 22 conveys the packets back to router 78 at step 60 (FIG. 2). In this case (unlike the preceding embodiments), the main routing table of router 78 has not been modified by guard device 22. Router 78 will therefore pass the packets injected by guard device 22 on to server 30 via the normal route that was previously determined. Alternatively, guard device 22 may be coupled to convey the processed packets to server 30 via another route, such as directly via router 80, bypassing router 78.

Further alternatively or additionally, it is possible (if less efficient) for guard device 22 to send a BGP announcement at step 50 instructing all routers 74, 76 to forward traffic destined for server 30 to guard device 22. In this case, it is necessary to ensure that routers 78 and 80 will still forward traffic injected by the guard device on to server 30, notwithstanding the BGP announcement. One way to achieve this result is to use a tunnel from guard device 22 to router 80 or router 82, as in the embodiment of FIG. 4, described above. A tunnel from guard device 22 leading to server 30 may also be used in conjunction with diversion via tunnels 84.

Although server 30 is shown in FIG. 4 as being outside the AS of area 70, the methods described hereinabove may similarly be applied in diverting traffic that is destined for nodes inside the AS.

Traffic Diversion in Layer-2 Topologies

Figure 6:
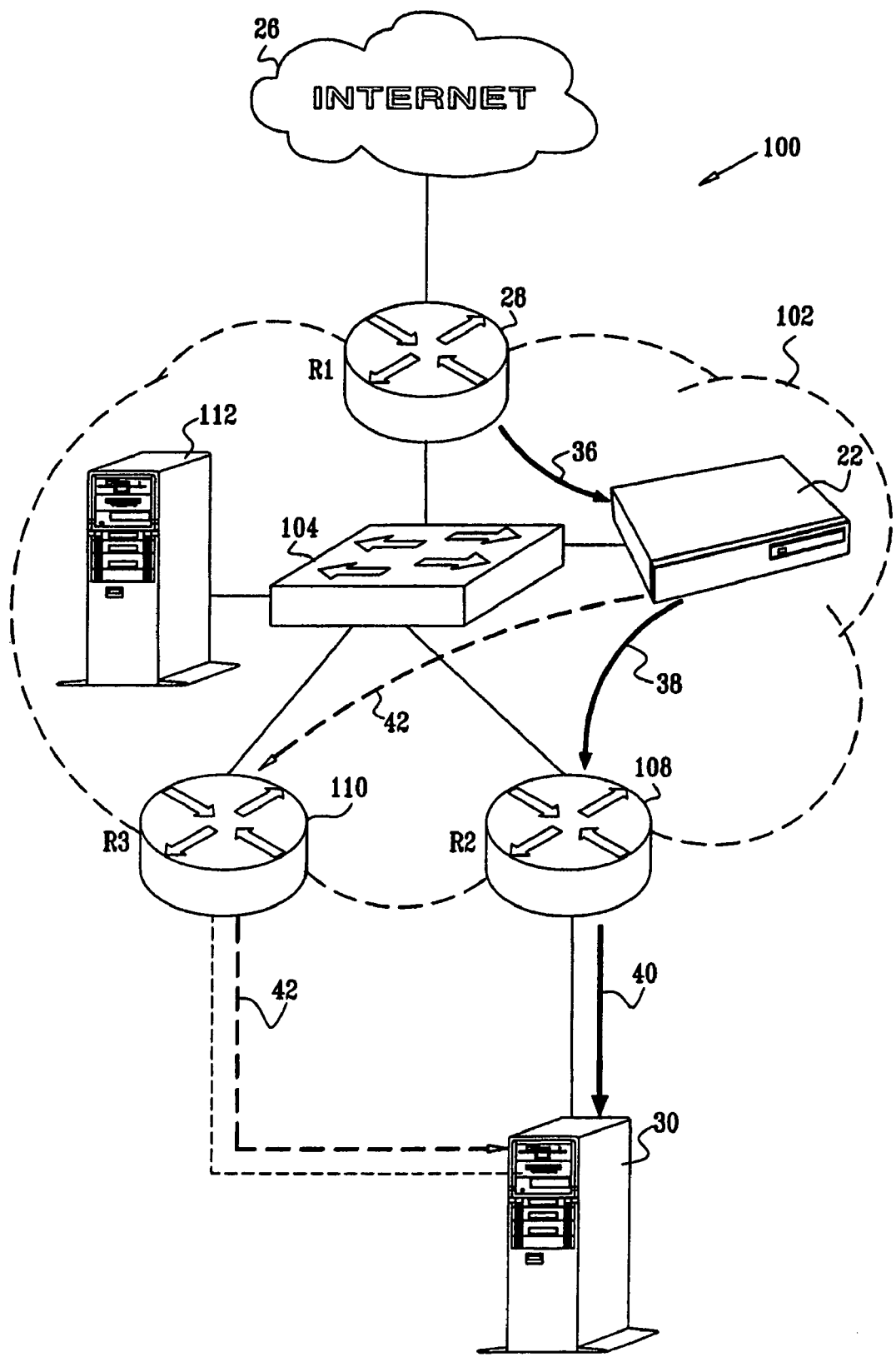
FIG. 6 is a block diagram that schematically illustrates a protected area of a network, in accordance with yet another embodiment of the present invention.

FIG. 6 is a block diagram that schematically illustrates a protected area 100 of a network, in accordance with another embodiment of the present invention. In this topology, divert-from router 28 is connected via a Layer-2 switch 104, such as an Ethernet switch, to other elements in a LAN 102. The LAN also contains guard device 22 and next-hop routers 108 and 110, which are coupled to forward traffic to server 30. At the Layer-3 level, all the elements of LAN 102 belong to the same IP subnet.

When guard device 22 instructs router 28 to activate diversion of packets destined for server 30, the diverted packets are conveyed to the guard device over path 36 through switch 104. Path 38, for injection of processed traffic by guard device 22, passes back through switch 104 but does not generally pass back through router 28 as in the embodiments described above. Therefore, there is generally no need in the Layer-2 topology to configure special filtering or other routing rules on router 28 to handle the packets that are returned by the guard device for forwarding to server 30. Rather, guard device 22 resolves the MAC address of router 108 or 110, and then forwards the packets via switch 104 to the appropriate MAC address. Any suitable method known in the art may be used by the guard device to ascertain the MAC address to which the packets are to be forwarded. For example, the guard device may issue an Address Resolution Protocol (ARP) query on LAN 102 for this purpose.

Guard device 22 may also be configured to protect network elements in LAN 102, such as a server 112. In this case, the guard device and server 112 belong to the same IP subnet. Thus, the guard device may forward traffic to the server directly through switch 104, without further IP forwarding.

Next-Hop Discovery

A number of different methods may be used to inform guard device 22 of the route that is to be used in forwarding traffic to server 30. One method is simply to pre-program the guard device and/or router 28 with routing information with respect to all of the network elements that the guard device is intended to protect. This information is used in forwarding packets at steps 60 and 62 (FIG. 2).

Alternatively, in some embodiments of the present invention, guard device 22 is configured to automatically learn the identity of the next-hop router to be used in forwarding packets to server 30 and to other network elements. Typically, the guard device uses information provided by routing protocols, such as BGP or an Interior Gateway Protocol (IGP) used by the routers in network 20 (FIG. 1) or in protected area 70 (FIG. 4). Common IGPs include the Routing Information Protocol (RIP), Open Shortest Path First (OSPF) and the Intermediate System-to-Intermediate System protocol (IS-IS). The routing information that is provided by the routing protocol to divert-from router 28 (FIG. 1) or router 78 (FIG. 4) indicates the IP addresses of the possible next-hop router or routers to server 30. Thus, if guard device 22 has the same view of this routing information as does the divert-from router, it will be able to determine the next-hop router to use in each case. In some cases, internal routing information provided by IGP is sufficient, while in other cases BGP information is required, as well, depending on whether guard device 22 and server 30 are part of the same AS.

In order to receive BGP information from the divert-from router, it is sufficient that guard device 22 be an iBGP neighbor of the router. The divert-from router will then propagate all the BGP announcements that it receives to the guard device, as provided by BGP convention.

On the other hand, IGP information is not automatically propagated in this manner. Therefore, in order to share in the IGP announcements that the divert-from router receives, guard device 22 may be connected by tunnels to the same next-hop routers as is the divert-from router. Tunnels 71 and 73, as shown in FIG. 4, may be used for this purpose. Via these tunnel connections, the guard device will receive the same IGP routing information with respect to next-hop routers 32 and 34 as will router 28, which is connected to routers 32 and 34 by physical connections.

As noted above, when server 30 does not belong to the same AS as the divert-from router, guard device 22 may need both IGP and BGP information in order to determine the next-hop router for forwarding traffic to the server. In this case, the guard device gathers BGP information in order to learn the route (or routes) from its own AS to server 30, and uses IGP information to learn the routes within the AS that connect with these external routes. The guard device combines these pieces of information in order to identify the next-hop routers.

While gathering the desired IGP and BGP information during the next-hop learning process, guard device 22 generally avoids announcing any routing information of its own or receiving any traffic through tunnels 71 and 73 other than routing announcements. For these purposes, guard device 22 is typically configured not to redistribute any information that it learns from iBGP, and tunnels 71 and 73 are assigned high routing costs, so that routers do not attempt to route traffic through them.

The methods described above are useful when the divert-from router uses automatic routing protocols in making its routing decisions. Alternatively or additionally, guard device 22 may query the divert-from router directly in order to determine the next hop on the route to server 30 (and to other protected network elements). This sort of querying may be used regardless of whether automatic routing protocols or static routing is used to configure the divert-from router.

A number of different management protocols may be used to query the divert-from router. For example, guard device 22 may send a query to the router using a Telnet or Secured Shell (SSH) connection. In this case, the guard device sends the command: "show ip route <target IP address>," causing the divert-from router to respond with the IP address of the next-hop router to the target IP address. Alternatively, the guard device may use a Simple Network Management Protocol (SNMP) query, or may use a Remote Shell (RSH) or Remote Command (RCMD) protocol to request the next-hop information from the router, without establishing a remote session with the router as required by Telnet or SSH.

Although methods and devices for traffic diversion are described hereinabove in the context of protecting a target address from receiving malicious traffic, the principles of the present invention may similarly be used in other applications of traffic diversion and filtering. For example, diversion may be useful in analysis of traffic flows for purposes such as detecting anomalies in data flows, billing, forensic analysis and law enforcement, and traffic engineering. Diversion has the advantage in these applications that the computer that is to analyze the traffic receives only the part of the traffic that is relevant for analysis, and is not burdened with filtering all the traffic on a given network link. In other words, diversion permits the analyzing computer (such as guard device 22) to operate at relatively low communication bandwidth, and to focus its resources on the particular analysis task at hand.

Diversion of this sort may also be used to permit the analyzing computer to process a number of different flows cyclically, one after the other. For this purpose, the diverting router (such as router 28) may cycle through the different flows, beginning by diverting the first flow to the analyzing computer for a certain period of time, then stopping diversion of the first flow and starting diversion of the second flow for its allotted time period, and so on through the entire cycle.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
coupling a first port of a Layer-3 packet router to receive communication traffic from a network, the traffic comprising packets destined for a target address, which is accessible via a second port of the router;
at the router, diverting the packets that are destined for the target address to a traffic processor via a third port of the router;
processing the diverted packets at the traffic processor, and returning the processed packets to the router via the third port; and
at the router, conveying the processed packets from the third port to the second port for delivery to the target address.

2. The method according to claim 1, wherein diverting the packets comprises detecting an indication that at least some of the traffic destined for the target address is of malicious origin, and diverting the packets responsively to the indication.

3. The method according to claim 2, wherein processing the diverted packets comprises filtering the diverted packets in order to identify the packets of the malicious origin, and inhibiting delivery of the identified packets.

4. The method according to claim 1, wherein diverting the packets comprises sending a Border Gateway Protocol (BGP) announcement from the traffic processor to the router, instructing the router to divert the packets.

5. The method according to claim 4, wherein sending the BGP announcement comprises inserting at least one of a "no-advertise" and a "no-export" string in the BGP announcement.

6. The method according to claim 1, wherein diverting the packets comprises:
establishing a tunnel through the network from a peering router to the first port of the Layer-3 packet router;
configuring the Layer-3 packet router to forward the packets that it receives through the tunnel to the third port; and
instructing the peering router to forward the packets that are destined for the target address through the tunnel.

7. The method according to claim 6, wherein establishing the tunnel comprises establishing a plurality of tunnels from peering routers at an edge of an area of a network to the Layer-3 packet router within the area.

8. The method according to claim 1, wherein returning the processed packets comprises selecting, at the traffic processor, a path via the Layer-3 packet router to the target address, and directing the Layer-3 packet router to convey the processed packets to a next-hop router along the selected path.

9. The method according to claim 8, wherein selecting the path comprises identifying a plurality of paths, passing through respective next-hop routers to the target address, and selecting one of the next-hop routers through which the processed packets are to be conveyed.

10. The method according to claim 9, wherein selecting the one of the next-hop routers comprises detecting, at the traffic processor, a change in the network between the second port of the router and the target address, and responsively to the change, selecting a different one of the next-hop routers through which to convey the processed packets to the target address.

11. The method according to claim 8, wherein selecting the path comprises receiving routing information at the traffic processor from the Layer-3 packet router, and identifying the path based on the routing information.

12. The method according to claim 11, wherein receiving the routing information comprises receiving announcements generated by routers in the network in accordance with an automatic routing protocol.

13. The method according to claim 12, wherein receiving the announcements comprises establishing at least one tunnel through the network between the traffic processor and the next-hop router, and receiving the announcements responsively to the at least one tunnel.

14. The method according to claim 11, wherein receiving the routing information comprises querying the Layer-3 packet router using a management protocol.

15. The method according to claim 8, wherein directing the router comprises establishing a tunnel through the network from the traffic processor via the router to the next-hop router, and passing the packets through the tunnel.

16. The method according to claim 1, wherein conveying the processed packets comprises programming the router with a forwarding rule with respect to the packets received by the router on the third port, so as to override a main routing table of the router, and forwarding the processed packets responsively to the forwarding rule.

17. The method according to claim 16, wherein programming the router comprises invoking policy-based routing (PBR).

18. The method according to claim 16, wherein programming the router comprises invoking filter-based forwarding (FBF).

19. The method according to claim 16, wherein programming the router comprises configuring the router to apply the forwarding rule responsively to a type of service (ToS) field in the processed packets, and wherein conveying the processed packets comprises setting a value of the ToS field in the packets so as to cause the forwarding rule to be invoked.

20. The method according to claim 1, wherein conveying the processed packets comprises adding a virtual private network (VPN) designation to the processed packets, and wherein conveying the processed packets comprises programming the router with a VPN routing table, and forwarding the processed packets responsively to the VPN routing table.

21. The method according to claim 20, wherein adding the VPN designation comprises adding a virtual local area network (VLAN) tag to the processed packets.

22. The method according to claim 21, wherein adding the VLAN tag comprises defining a plurality of VLANs corresponding to different routes to the target address, and wherein adding the VLAN tag comprises selecting one of the routes, and setting a value of the VLAN tag to designate the selected one of the routes.

23. A method for communication, comprising:
coupling one or more peering routers in an area of a network to receive communication traffic from outside the area, the traffic comprising packets destined for a target address;
forwarding the packets to the target address over one or more first routes via one or more internal routers within the area of the network;
establishing one or more tunnels through the network from the peering routers via one or more first ports of a diverting router within the area of the network to a second port of the diverting router;
coupling a traffic processor to the second port of the diverting router;
in response to a characteristic of the traffic, instructing the one or more peering routers to forward the packets that are destined for the target address through the one or more tunnels instead of over the first routes;
at the traffic processor, processing the packets that were forwarded through the tunnels via the diverting router; and
conveying at least some of the processed packets from the traffic processor to the target address.

24. The method according to claim 23, wherein instructing the one or more peering routers comprises detecting an indication that at least some of the traffic destined for the target address is of malicious origin, and instructing the one or more peering routers responsively to the indication.

25. The method according to claim 24, wherein processing the diverted packets comprises filtering the diverted packets in order to identify the packets of the malicious origin, and inhibiting delivery of the identified packets.

26. The method according to claim 23, wherein instructing the one or more peering routers comprises sending a Border Gateway Protocol (BGP) announcement from the traffic processor to the one or more peering routers.

27. The method according to claim 23, wherein instructing the one or more peering routers comprises sending an instruction to the one or more peering routers, without modifying routing tables of the internal routers.

28. The method according to claim 23, wherein the diverting router serves as one of the internal routers on at least one of the first routes.

29. The method according to claim 23, wherein conveying the at least some of the processed packets comprises conveying the at least some of the processed packets via the diverting router to the target address.

30. The method according to claim 23, wherein conveying the at least some of the processed packets comprises establishing a further tunnel between the traffic processor and an edge router on a path to the target address, and conveying the at least some of the processed packets through the further tunnel.

31. A method for communication, comprising:
coupling a first port of a Layer-3 packet router to receive communication traffic from a network, the traffic comprising packets destined for a target address;
coupling a second port of the Layer-3 packet router to a subnet, through which the target address is accessible;
diverting the packets that are destined for the target address to a traffic processor on the subnet via a Layer-2 switch in the subnet;
processing the diverted packets at the traffic processor, and returning the processed packets to the Layer-2 switch; and
conveying the processed packets from the Layer-2 switch to the target address.

32. The method according to claim 31, wherein diverting the packets comprises detecting an indication that at least some of the traffic destined for the target address is of malicious origin, and diverting the packets responsively to the indication.

33. The method according to claim 32, wherein processing the diverted packets comprises filtering the diverted packets in order to identify the packets of the malicious origin, and inhibiting delivery of the identified packets.

34. The method according to claim 31, wherein the target address is in the subnet.

35. The method according to claim 31, wherein the target address is outside the subnet, and wherein conveying the processed packets comprises passing the processed packets from the Layer-2 switch to a further router in the subnet, and routing the processed packets from the further router to the target address.

36. Apparatus for communication, comprising:
a Layer-3 packet router, comprising at least first, second and third ports, wherein the first port is coupled to receive communication traffic from a network, the traffic comprising packets destined for a target address, which is accessible via a second port of the router; and
a traffic processor, which is coupled to the third port of the router, and is adapted to cause the router to divert the packets that are destined for the target address to the third port, and is further adapted to process the diverted packets and to return the processed packets to the router via the third port so as to cause the router to convey the processed packets from the third port to the second port for delivery to the target address.

37. The apparatus according to claim 36, wherein the traffic processor is adapted to cause the router to divert the packets responsively to an indication that at least some of the traffic destined for the target address is of malicious origin.

38. The apparatus according to claim 37, wherein the traffic processor is adapted to filter the diverted packets in order to identify the packets of the malicious origin, and to inhibit delivery of the identified packets.

39. The apparatus according to claim 36, wherein the traffic processor is adapted to send a Border Gateway Protocol (BGP) announcement to the router, instructing the router to divert the packets.

40. The apparatus according to claim 39 wherein the BGP announcement comprises at least one of a "no-advertise" and a "no-export" string.

41. The apparatus according to claim 36, and comprising a peering router, which is coupled by a tunnel through the network to the first port of the Layer-3 packet router,
wherein the traffic processor is adapted to instruct the peering router to forward the packets that are destined for the target address through the tunnel, and wherein the Layer-3 packet router is configured to forward the packets that it receives through the tunnel to the third port.

42. The apparatus according to claim 41, wherein the peering router is one of a plurality of peering routers at an edge of an area of a network, which are coupled by a respective plurality of tunnels to the Layer-3 packet router within the area.

43. The apparatus according to claim 36, wherein the traffic processor is adapted to select a path via the Layer-3 packet router to the target address, and to direct the Layer-3 packet router to convey the processed packets to a next-hop router along the selected path.

44. The apparatus according to claim 43, wherein the traffic processor is adapted to identify a plurality of paths, passing through respective next-hop routers to the target address, and to select one of the next-hop routers through which the processed packets are to be conveyed.

45. The apparatus according to claim 44, wherein the traffic processor is adapted to detect a change in the network between the second port of the router and the target address, and responsively to the change, to select a different one of the next-hop routers through which to convey the processed packets to the target address.

46. The apparatus according to claim 43, wherein the traffic processor is coupled to receive routing information from the Layer-3 packet router, and is adapted to identify the path based on the routing information.

47. The apparatus according to claim 46, wherein the routing information received by the traffic processors comprises announcements generated by routers in the network in accordance with an automatic routing protocol.

48. The apparatus according to claim 47, wherein the traffic processor is coupled by at least one tunnel through the network to the next-hop router, and is adapted to receive the announcements responsively to the at least one tunnel.

49. The apparatus according to claim 46, wherein the traffic processor is adapted to receive the routing information by querying the Layer-3 packet router using a management protocol.

50. The apparatus according to claim 43, wherein the traffic processor is coupled to the next-hop router by a tunnel through the network via the router, and is adapted to direct the Layer-3 packet router to convey the processed packets through the tunnel.

51. The apparatus according to claim 36, wherein the router is programmed to forward the processed packets in accordance with a forwarding rule, which overrides a main routing table of the router.

52. The apparatus according to claim 51, wherein the router is programmed using policy-based routing (PBR).

53. The apparatus according to claim 51, wherein the router is programmed using filter-based forwarding (FBF).

54. The apparatus according to claim 51, wherein the router is configured to apply the forwarding rule responsively to a type of service (ToS) field in the processed packets, and wherein the traffic processor is adapted to set a value of the ToS field in the processed packets so as to cause the forwarding rule to be invoked.

55. The apparatus according to claim 36, wherein the traffic processor is adapted to add a virtual private network (VPN) designation to the processed packets, and wherein the router is programmed with a VPN routing table, and forwards the processed packets responsively to the VPN designation in accordance with the VPN routing table.

56. The apparatus according to claim 55, wherein the VPN designation comprises a virtual local area network (VLAN) tag.

57. The apparatus according to claim 56, wherein the VLAN is one of a plurality of VLANs corresponding to different routes to the target address, and wherein the traffic processor is adapted to select one of the routes, and to set a value of the VLAN tag to designate the selected one of the routes.

58. Apparatus for communication, comprising:
   one or more peering routers in an area of a network, which are coupled to receive communication traffic from outside the area, the traffic comprising packets destined for a target address;
   one or more internal routers within the area of the network, which are coupled to receive the packets from the one or more peering routers, and to forward the packets to the target address over one or more first routes;
   a diverting router within the area of the network, the diverting router comprising one or more first ports and a second port, wherein the first ports are coupled to the peering routers by one or more tunnels through the network, and the diverting router is configured to pass the packets that it receives through the one or more tunnels to the second port;
   a traffic processor, which is coupled to the second port of the diverting router, and which is adapted, in response to a characteristic of the traffic, to instruct the one or more peering routers to forward the packets that are destined for the target address through the one or more tunnels instead of over the first routes, and to process the packets that were forwarded through the tunnels via the diverting router, and to convey at least some of the processed packets to the target address.

59. The apparatus according to claim 58, wherein the traffic processor is adapted to instruct the one or more peering routers to forward the packets through the one or more tunnels responsively to an indication that at least some of the traffic destined for the target address is of malicious origin.

60. The apparatus according to claim 59, wherein the traffic processor is adapted to filter the diverted packets in order to identify the packets of the malicious origin, and to inhibit delivery of the identified packets.

61. The apparatus according to claim 58, wherein the traffic processor is adapted to instruct the one or more peering routers to forward the packets through the one or more tunnels by sending a Border Gateway Protocol (BGP) announcement to the one or more peering routers.

62. The apparatus according to claim 58, wherein the traffic processor is adapted to instruct the one or more peering routers to forward the packets through the one or more tunnels without modifying routing tables of the internal routers.

63. The apparatus according to claim 58, wherein the diverting router is coupled to serve as one of the internal routers on at least one of the first routes.

64. The apparatus according to claim 58, wherein the traffic processor is adapted to convey the at least some of the processed packets via the diverting router to the target address.

65. The apparatus according to claim 58, wherein the traffic processor is adapted to convey the at least some of the processed packets through a further tunnel between the traffic processor and an edge router on a path to the target address.

66. Apparatus for communication, comprising:
   a Layer-2 switch, located in a subnet through which a target address is accessible;
   a Layer-3 packet router, comprising first and second ports, wherein the first port is coupled to receive communication traffic from a network, the traffic comprising packets destined for the target address, and the second port is coupled to the Layer-2 switch; and
   a traffic processor, which is adapted to cause the Layer-3 packet router to divert the packets that are destined for the target address via the Layer-2 switch to the traffic processor, and which is further adapted to process the diverted packets and to return the processed packets to the Layer-2 switch so as to cause the Layer-2 switch to convey the processed packets to the target address.

67. The apparatus according to claim 66, wherein the traffic processor is adapted to instruct the Layer-3 packet router to divert the packets responsively to an indication that at least some of the traffic destined for the target address is of malicious origin.

68. The apparatus according to claim 67, wherein the traffic processor is adapted to filter the diverted packets in order to identify the packets of the malicious origin, and to inhibit delivery of the identified packets.

69. The apparatus according to claim 66, wherein the target address is in the subnet.

70. The apparatus according to claim 66, and comprising a further router in the subnet, wherein the target address is outside the subnet, and wherein the Layer-2 switch is coupled to pass the processed packets to a further router in the subnet, and wherein the further router is adapted to route the processed packets to the target address.

71. A computer software product, for use by a computer in conjunction with a Layer-3 packet router that includes at least first, second and third ports, wherein the first port is coupled to receive communication traffic from a network, the traffic including packets destined for a target address, which is accessible via a second port of the router, and the computer is coupled to the third port, the product comprising:

a computer-readable medium in which program instructions are stored, which instructions, when read by the computer, cause the computer to instruct the router to divert the packets that are destined for the target address to the third port, and further cause the computer to process the diverted packets and to return the processed packets to the router via the third port so as to cause the router to convey the processed packets from the third port to the second port for delivery to the target address.

* * * * *